United States Patent
Smith et al.

(10) Patent No.: US 7,106,252 B2
(45) Date of Patent: *Sep. 12, 2006

(54) USER TERMINAL ANTENNA ARRANGEMENT FOR MULTIPLE-INPUT MULTIPLE-OUTPUT COMMUNICATIONS

(75) Inventors: Martin Smith, Chelmsford (GB);
Dawn Power, Bishop's Stortford (GB);
Sonya Amos, Bishop's Stortford (GB);
Roger Perrott, Chelmsford (GB)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 10/506,060

(22) PCT Filed: Feb. 24, 2003

(86) PCT No.: PCT/GB03/00795

§ 371 (c)(1),
(2), (4) Date: Aug. 26, 2004

(87) PCT Pub. No.: WO03/073552

PCT Pub. Date: Sep. 4, 2003

(65) Prior Publication Data

US 2005/0104777 A1    May 19, 2005

Related U.S. Application Data

(60) Provisional application No. 60/362,840, filed on Feb. 26, 2002.

(51) Int. Cl.
*H01Q 1/24* (2006.01)
*H01Q 21/00* (2006.01)

(52) U.S. Cl. .............................. 343/700 MS; 343/725; 343/846

(58) Field of Classification Search ............... 343/702, 343/700 MS, 725, 846, 848
See application file for complete search history.

(56) References Cited

U.S. PATENT DOCUMENTS

| | | | |
|---|---|---|---|
| 5,463,406 A * | 10/1995 | Vannatta et al. | ............ 343/725 |
| 5,486,836 A | 1/1996 | Kuffner | |
| 5,752,204 A | 5/1998 | Epperson | |
| 5,905,467 A | 5/1999 | Narayanaswamy | |
| 5,937,332 A | 8/1999 | Karabinis | |
| 5,943,020 A | 8/1999 | Liebendoerfer | |
| 6,806,835 B1 * | 10/2004 | Iwai et al. | .................. 343/702 |

FOREIGN PATENT DOCUMENTS

WO    WO 02/058187 A1    7/2002

\* cited by examiner

*Primary Examiner*—Tan Ho
(74) *Attorney, Agent, or Firm*—Barnes & ThornburgLLP

(57) ABSTRACT

Multiple input multiple output (MIMO) systems are able to provide wireless communications at increased data rates. These systems involve using a plurality of antennas on both the transmitter and receiver and the problem of how to accommodate such structures in user terminals, which are often required to be hand held then arises. An antenna arrangement which is suitable for MIMO communications and which can be incorporated into a user terminal such as a personal digital assistant (PDA) is described. A pair of co-polarised umbrella monopoles and a slot antenna are incorporated into a flap which extends at approximately 90° to the body of the PDA. A fourth monopole is mounted and protrudes from the PDA itself.

20 Claims, 10 Drawing Sheets

USER TERMINAL ANTENNA ARRANGEMENT FOR MULTIPLE-INPUT MULTIPLE-OUTPUT COMMUNICATIONS

RELATED APPLICATION

This application is the national filing of international application No. PCT/GB03/00795 filed Feb. 24, 2003 which is the nonprovisional filing of provisional application No. 60/362,840, filed Feb. 26, 2002.

FIELD OF THE INVENTION

The present invention relates to an antenna arrangement suitable for user terminal multiple-input multiple-output radio communications systems.

BACKGROUND TO THE INVENTION

The demand for wireless communication systems has grown steadily over recent decades, and has included several technological jumps over this time, particularly in the area of cellular and wireless local area network (WLAN) communication systems. Analogue cellular phones have been replaced with digital handsets using for example GSM and CDMA technologies, and so called third generation systems such as UMTS are now being introduced. Similarly WLAN technologies such as HyperLan and IEEE 802.11b are also being introduced. The number of users continues to increase and data traffic is now becoming an important part of the wireless network. Both of these factors mean that it is important for operators to look for methods of increasing the capacity of their networks to meet future demands.

An increasing demand to access the internet and other data networks has led to the need for increased capacity particularly in the downlink direction. That is, increased capacity from basestations to wireless user terminals in order that users are able to download web pages and other information. One way of addressing this problem is to use multiple input multiple output (MIMO) systems which are able to provide increased data rates. These systems involve using a plurality of antennas on both the transmitter and receiver and the problem of how to accommodate such structures in user terminals, which are often required to be hand held then arises.

In our earlier U.S. patent application Ser. No. 09/765,532, filed on 19 Jan. 2001 and also assigned to Nortel Networks, we describe an antenna arrangement for use in a laptop computer to provide MIMO communications. Three or four antennas are provided around the edges of the screen part of the laptop computer which is preferably oriented vertically when in use. The antennas are all integrated into the body of the laptop where the body includes the screen part. Transmission line loaded antennas are used such as bent folded monopoles or planar inverted F antennas. Each antenna has a monopole section which is perpendicular to a ground plane. Whilst the systems described in Ser. No. 09/765,532 are fully workable the present invention seeks to extend our earlier work.

Considering hand-held user terminals such as personal digital assistants (PDAS) these are currently available from a range of manufacturers such as Palm, Handspring and IBM. Some PDAs such as the Palm VIIx are provided with wireless communications capability, either using a transceiver built into the PDA, or by mounting the PDA in a separate cradle. However, these systems provide a single channel wireless solution in the same way as conventional mobile terminals rather than enabling MIMO communications.

The invention seeks to provide an antenna arrangement suitable for user terminal multiple-input multiple-output radio communications systems which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided an antenna arrangement suitable for use in a user terminal in order to provide wireless multiple-input-multiple-output (MIMO) communications, said antenna arrangement comprising:

at least a first and a second ground plane, the first ground plane arranged to be provided in a body of the user terminal and the second ground plane arranged to be provided external to the body of the user terminal; and two or more antennas each associated with one of the ground planes, at least one of the antennas being associated with the first ground plane and at least another of the antennas being associated with the second ground plane.

For example, the antenna arrangement can be used in a user terminal such as a PDA, a mobile telephone or any other suitable type of user terminal. By using two or more antennas MIMO communications can be achieved. Also, by having one ground plane external to the user terminal body problems as a result of space restrictions in the user terminal body are avoided, whilst at the same time enabling the plurality of antennas to be accommodated. For example, the user terminal may be a PDA, laptop computer or other device. The electronic components which provide the functionality for the PDA or other device are provided in the body of the user terminal. By providing one ground plane for the antenna arrangement external to the body it is possible to provide a MIMO capable antenna arrangement without needing to alter the existing electronics in the body of the PDA. That is, the antenna arrangement is accommodated using the user terminal body and external ground plane without affecting components within the user terminal body that provide functionality independent of the antenna arrangement.

Preferably, the antennas are arranged and positioned in order that angular coverage provided by the antennas in use is maximised in at least one plane. For example, the antennas can be arranged to be substantially omnidirectional in an azimuth plane in use. This provides the advantage that communications can be established no matter which particular orientation the terminal is given.

Preferably, at least some of said antennas are arranged to provide spatial diversity. This provides the advantage the effects of spatial fading can be avoided as far as possible.

In a preferred embodiment the ground planes are positioned with respect to one another in use such that polarisation diversity is provided between antennas associated with different ones of the ground planes. Also, polarisation diversity for any orientation of the antenna arrangement can be achieved.

Preferably, the user terminal (including the antenna arrangement) is arranged to be hand held. This provides the advantage that the antenna arrangement can enable MIMO communications to a terminal such as a PDA or mobile telephone and give increased data rates to that terminal.

Advantageously, the user terminal comprises a display and one of the ground planes is substantially parallel with the display. For example, the user terminal can be a PDA with a display face. Circuit boards within the PDA itself, which provide the functionality of the PDA, effectively form a ground plane which is substantially parallel to the display face. By making use of this ground plane an antenna arrangement that can be incorporated into the PDA structure can be achieved, despite the size restrictions imposed by the PDA structure.

In a preferred embodiment another of said ground planes is arranged to be provided in a flap moveably connected to the user terminal. This provides the advantage that at least part of an antenna arrangement can be incorporated into the flap where more space is available than in the PDA body itself. For example, the flap is of a similar area to the display face of the PDA. Because the flap is connected to the user terminal the antenna arrangement in the flap can also easily be permanently connected to the user terminal. This is advantageous compared to systems using cradles or other separate devices which need to be connected to a terminal and which can easily be lost or damaged. Also, because the flap is moveably connected to the user terminal, for example, using a hinge, it is easy to operate. The PDA can be supported on a table in use for example, by being propped up using the flap. Alternatively, the PDA can be held in the hand with the flap extending over and behind the user's hand.

Preferably, the antenna arrangement comprises a first pair of antennas and a second pair of antennas, said first pairs of antennas being polarisation diverse with respect to the second pair of antennas. Using this type of system four antennas are provided in two pairs which have polarisation diversity and can advantageously be used in a MIMO communications system.

Preferably, the first pair of antennas is fed from a first ground plane and only one of the second pair of antennas is also fed from that first ground plane. For example, the first ground plane can be incorporated into the flap of a PDA as mentioned above. This provides the advantage that three of the four antennas are associated with a ground plane that is not in the body of the PDA itself, where space restrictions are harsh and many conductors are present. However, it is also possible to incorporate two or three of the antennas in the body of the PDA itself as explained in more detail below.

Advantageously, the first pair of antennas are spaced as far apart from one another as possible whilst still being suitable for accommodation in the user terminal. For example, these two antennas are provided in the flap of a PDA as mentioned above. By spacing those antennas as far apart from one another as possible spatial diversity is provided to alleviate problems associated with spatial fading.

Preferably, said first pair of antennas are selected from monopoles and umbrella monopoles. This provides the advantage that the antennas are of a simple structure which is easy to install. Also, the antennas provide good omnidirectional coverage in an azimuth plane. Umbrella monopoles are advantageous in situations where space is restricted. These are a type of top-loaded monopole. Top-loaded monopoles are preferred because these have a 2D structure which can be used to achieve a slim-line antenna structure that is suitable for PDAs. However, normal mode spiral structures can also be used provided sufficient depth is available for such 3D structures.

In a preferred embodiment one of the second pair of antennas is a slot. This provides the advantage that a simple antenna structure that is easy to install is provided. Also the radiation pattern characteristics are similar to that for the monopole structure mentioned above but with the opposite polarisation. The slot can be shortened to save space, for example, by forming a dumbbell.

Preferably the other of the second pair of antennas is a monopole and is arranged to protrude from the user terminal in use. This provides the advantage that good omnidirectional coverage in an azimuth plane is achieved. Also the antenna structure is simple and can easily be arranged to fold away against the body of the user terminal or to retract into the body of the user terminal when not in use.

In another embodiment the antenna arrangement, when used as part of a communications device, comprises fewer receive chains than there are antennas. This provides the advantage that costs are reduced because receive chains are relatively expensive. Also, the advantage that it is possible to select those antennas which provide the best performance at any one time is achieved. For example, the antennas can be arranged to have directional antenna patterns that differ from one another and which are designed to take into account blocking caused by the user terminal structure itself. This is also advantageous in the situation that a plurality of such user terminals are being used simultaneously. By using directional antennas, interference levels are reduced and carrier to interference levels improved when considering all the user terminals together. In order to select which antennas to use a switching means can be provided to allow the receive chains to be switched between the antennas. Alternatively, adaptive combination of the antennas is used as described in more detail below.

Preferably, each antenna is substantially co-planar with its associated ground plane. This provides the advantage that a slim-line design is achieved which is suitable for use in user terminals whose depth is limited.

In another embodiment, each of the antennas is directional in that it has a directive gain in at least one of two different directions. This provides the advantage that carrier to interference levels are improved as compared with situations in which all the antennas are omnidirectional.

According to another aspect of the present invention there is provided a user terminal comprising an antenna arrangement suitable for providing wireless multiple-input-multiple-output (MIMO) communications, said antenna arrangement comprising:

at least a first and a second ground plane, the first ground plane being provided in a body of the user terminal and the second ground plane being provided external to the body of the user terminal; and two or more antennas each associated with one of the ground planes, at least one of the antennas being associated with the first ground plane and at least another of the antennas being associated with the second ground plane.

The invention also encompasses a multiple-input-multiple-output communications system comprising a user terminal as defined immediately above and a signal processor arranged to implement a space time coding communications transmission or reception method. The signal processor is incorporated in either the PDA body and/or the flap.

This provides the advantage that the data rate of communications with the user terminal are improved as compared with a multi-beam antenna system for example.

According to another aspect of the present invention there is provided a method of transmitting or receiving space time coding communications using a user terminal comprising the steps of:

providing at least a first and a second ground plane, the first ground plane being provided in a body of the user terminal and the second ground plane being provided external to the body of the user terminal; and providing two or more antennas each associated with one of the ground planes, at least one of the antennas being associated with the first ground plane and at least another of the antennas being associated with the second ground plane.

The invention is also directed to a method by which the described apparatus operates and including method steps for carrying out every function of the apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "directional antenna" is used to refer to an antenna which has a pattern that is not omnidirectional and which has significant directive gain in a particular direction.

Figure 1:
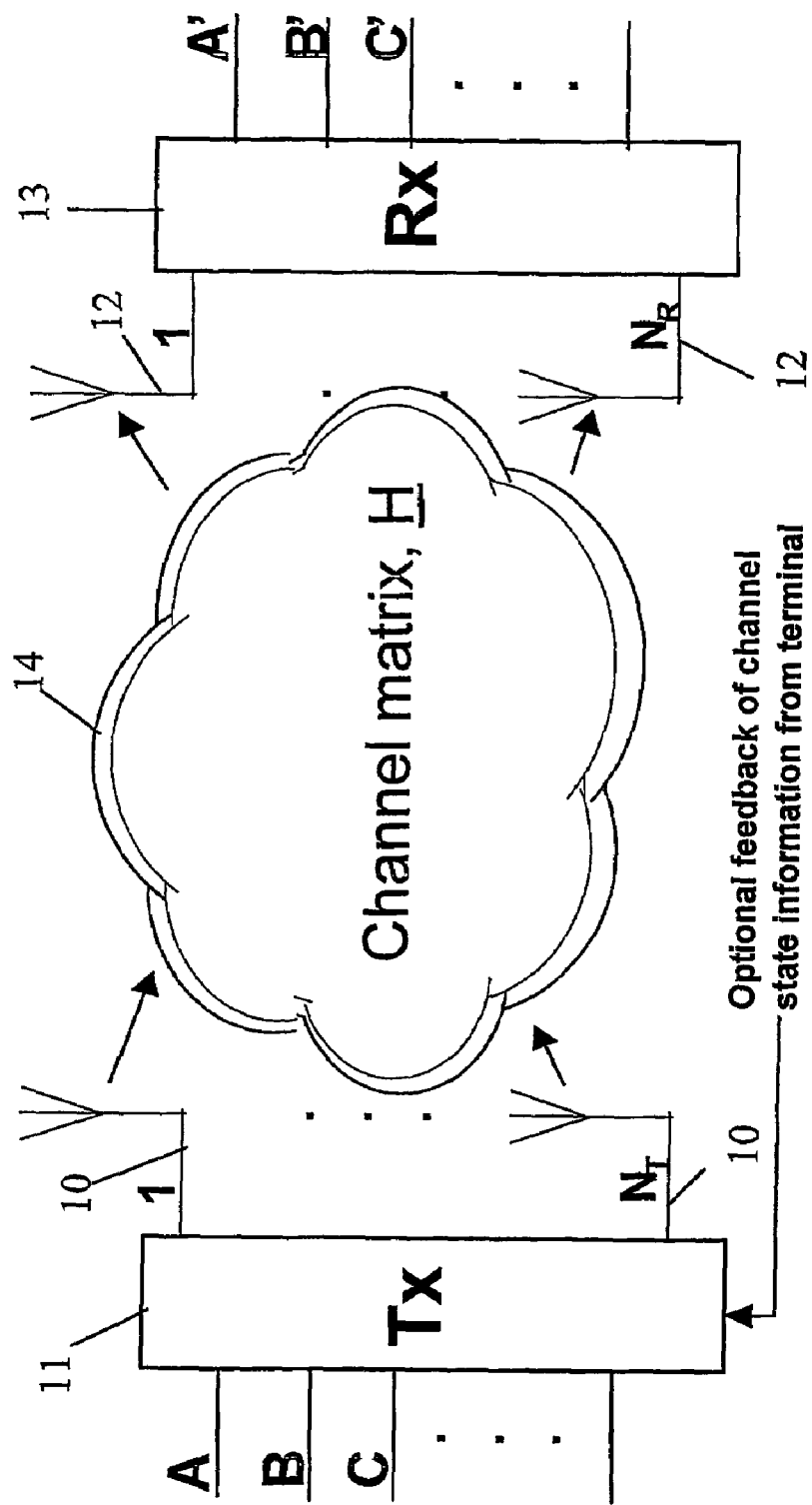
FIG. 1 is a schematic diagram of a prior art MIMO wireless communications system.

A MIMO wireless communication system (see FIG. 1) is one which comprises a plurality of antennas 10 at the transmitter 11 and a plurality of antennas 12 at the receiver 13. The antennas 10, 12 are employed in a multi-path rich environment such that due to the presence of various scattering objects (buildings, cars, hills, etc.) in the environment, each signal experiences multipath propagation. Thus a cloud shape 14 is shown in FIG. 1 to represent the scattered signals between the transmit and receive antennas. User data is transmitted from the transmit antennas using a space-time coding (STC) transmission method as is known in the art. The receive antennas 12 capture the transmitted signals and a signal processing technique is then applied as known in the art, to separate the transmitted signals and recover the user data.

MIMO wireless communication systems are advantageous in that they enable the capacity of the wireless link between the transmitter and receiver to be improved compared with previous systems in the respect that higher data rates can be obtained. The multipath rich environment enables multiple orthogonal channels to be generated between the transmitter and receiver. Data for a single user can then be transmitted over the air in parallel over those channels, simultaneously and using the same bandwidth. Consequently, higher spectral efficiencies are achieved than with non-MIMO systems.

One problem with existing MIMO systems concerns the large size of the transmit and receive antenna arrays. Previously, MIMO transmit and receive antenna arrays have used spatially diverse antenna arrays. That is, the spacing between the individual antenna elements is arranged to be large enough such that decorrelated spatial fading is obtained. This is necessary in order to prevent the number of orthogonal channels from being reduced. That is, if the fading characteristics between antenna elements is similar (correlated) then the number of orthogonal channels that can be realised is reduced. However, as described in our earlier U.S. patent application Ser. No. 09/975,653 it is possible to use polarisation diverse antenna elements that are positioned closely to produce a compact antenna arrangement whilst still enabling MIMO communications to be provided.

The present invention recognises that for MIMO antenna systems in particular, it will be desirable to provide two or more diverse antenna elements in a compact radio terminal. In order to take full advantage of the propagation channels available it is important that the antenna system can receive signals of two orthogonal polarisations and have as full an angular coverage in the azimuth plane as possible. Good angular coverage in the azimuth plane is desired because the antenna arrangement is preferably incorporated into a portable user terminal. The particular orientation of the user terminal will then vary depending on that preferred by the user in a particular environment. Thus a signal received from a basestation at the user terminal could arrive at any principle angle relative to the orientation of the user terminal. In practice there will be angle spread about the principal direction, for example of the order of 45° for an outdoor to indoor path and this is advantageously exploited by a MIMO system to provide parallel channels from reasonably closely spaced antenna elements, as described in detail below. As well as the requirements mentioned above, it is desired to provide as much spatial diversity as possible between two antennas of like polarisation in order to reduce the effects of spatial fading. This is less important between antennas of unlike polarisation because the propagation channel provides decorrelation.

A preferred embodiment of the present invention is now described in detail. This embodiment concerns an antenna arrangement for a PDA although the arrangement is also applicable to other types of terminal. Also, whilst the antenna arrangement has particular application in MIMO cellular and WLAN application, the antennas could also be used in other applications such as standard receive or transmit diversity for example.

Figure 2:
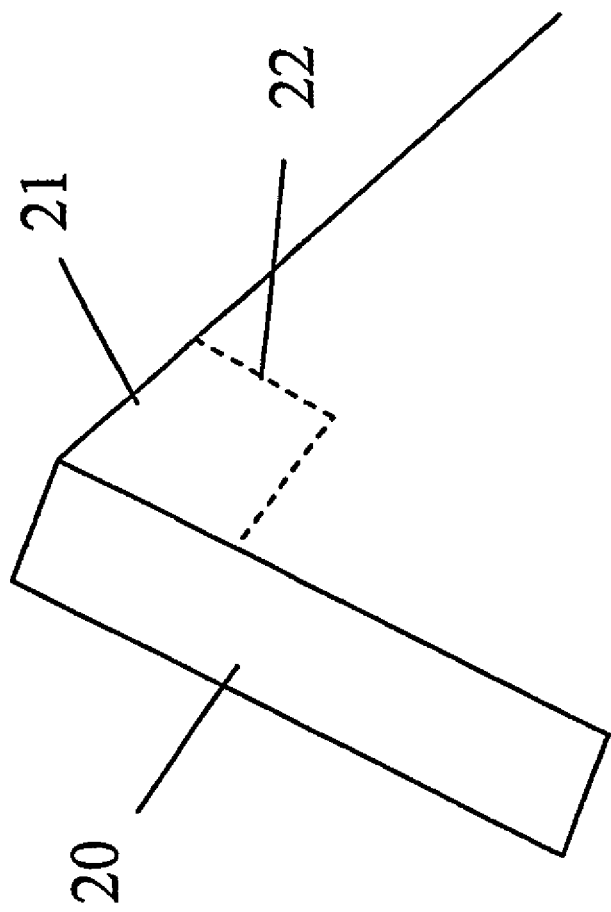
FIG. 2 is a side view of a personal digital assistant (PDA) incorporating an antenna arrangement.

As shown in FIG. 2 a PDA 20 is provided with a support 21 which can be used to prop up the PDA in use as shown. In a particularly preferred example, the angle 22 between the PDA and the support 21 is about 90°, although this is not essential as described in more detail below. For example, the support 21 can be a flap that is moveably connected to the PDA such that it covers a display screen face of the PDA when not in use. The flap can be arranged to fold around the side or over the top of the PDA. Alternatively the support 21 can be separate to the PDA, or may be a cover or case that is removable and can be used as a support as shown in FIG. 2. The support is arranged to accommodate at least one ground plane for an antenna arrangement as well as one or more antennas.

In a preferred embodiment the flap is hinged to a side of the PDA and covers a display screen face of the PDA when the PDA is not in use. In use, the flap is extended behind and used to prop up the PDA as shown in FIG. 2. Antennas of the antenna arrangement are then integrated into either the flap or the PDA itself. Preferably the antennas are integrated into the flap (or cover or other support), in which more space is available than in the PDA. The PDA (or other type of user terminal) itself contains electronics for providing the functionality of the PDA and it is required not to disrupt or alter these. In addition, interference to the antenna operation caused by the electronics in the PDA body needs to be avoided. By using the flap (or other structure) which is external to the PDA body these problems are addressed.

Figure 3:
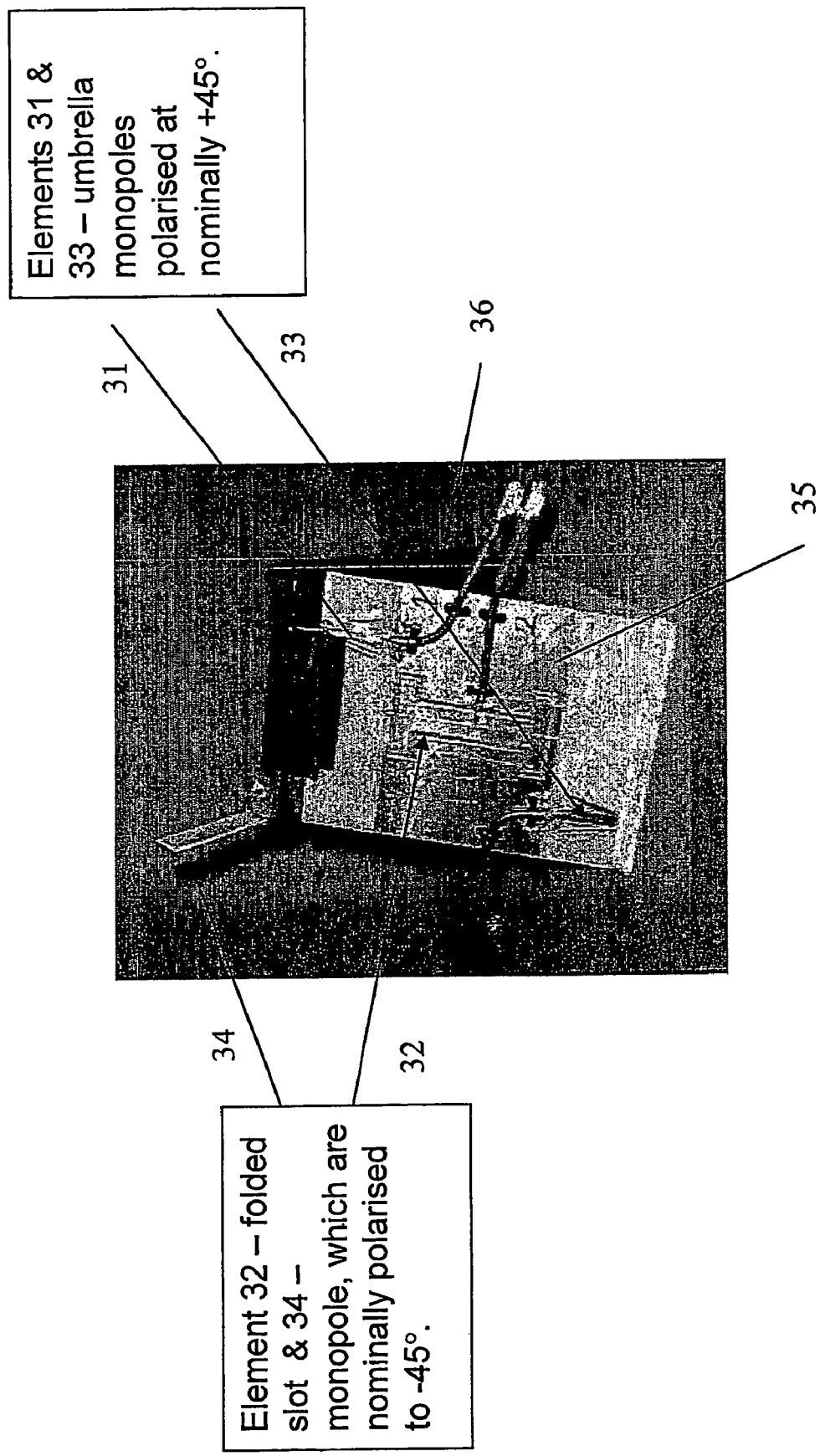
FIG. 3 is a perspective view of an antenna arrangement for use in a PDA.

Preferably four antennas are used, three incorporated into the flap and one mounted on the PDA itself. However, this is not essential. Any suitable number of antennas can be used. FIG. 3 shows a preferred embodiment of an antenna arrangement with three antennas 31, 32, 33 associated with ground plane 35 and one antenna 34 associated with a second ground plane 36. The first ground plane 35 and its three associated antennas is arranged to be incorporated into the flap 21 of FIG. 2 and the second ground plane is arranged to be incorporated into the PDA itself. The ground planes may be of metal or metallized plastic. For example, the PDA body contains circuit boards for providing the functionality of the PDA itself. These circuit boards effectively provide the first ground plane 35. The antenna 34 that is associated with the second ground plane 36 is preferably mounted on the PDA so that it protrudes from the top of the PDA as shown in FIG. 3. It can be retractable or arranged to fold against the body of the PDA when not in use.

Figure 4:
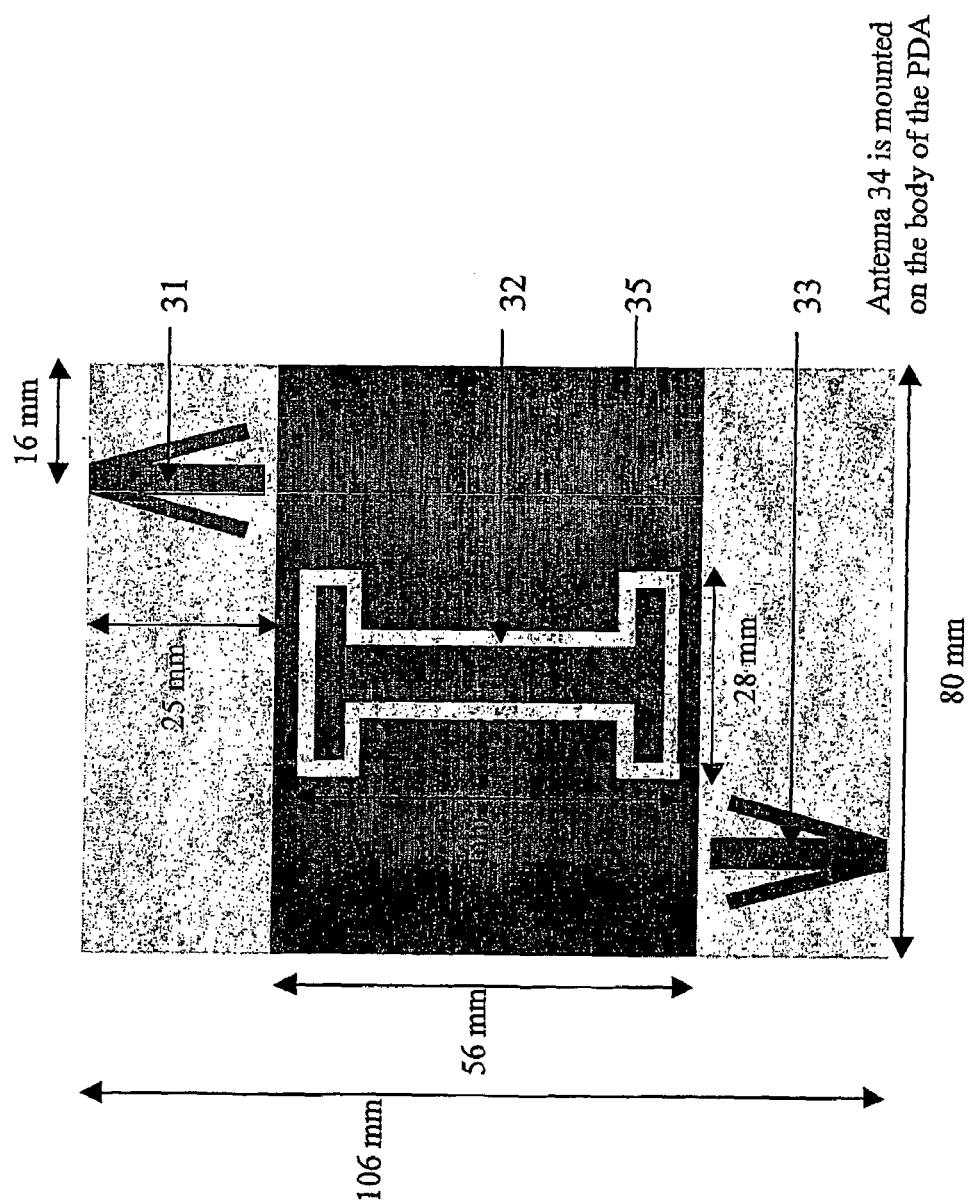
FIG. 4 is a schematic diagram of the antenna arrangement of FIG. 3.

The three antennas to be provided in the flap are illustrated in FIG. 4 in more detail. The dimensions shown in FIG. 4 are those used in a particular arrangement from which empirical measurements were taken as described below. However, these dimensions are examples only and other suitable sized components can be used. Preferably the four antennas 31–34 comprise two pairs of antennas. In this particular example, antennas 31 and 33 are co-polarised at +45° when viewed from a particular orientation and antennas 32 and 34 are co-polarised at −45° when viewed from a particular orientation. Within each pair of antennas, those antennas are spaced as far apart as possible in order to provide spatial diversity. Thus antennas 31 and 33 are mounted at opposite corners of the flap (in this case, bottom left and top right of the flap). However, it is not essential to mount antennas 31 and 33 at opposite corners of the flap; any suitable separation between those antennas can be used depending on the amount of spatial diversity required.

When the flap is positioned at 90° to the PDA body then identical antennas mounted on the flap and PDA will be oppositely polarised. This is relevant for the other pair of antennas, 32, 34 where one antenna 32 is mounted on the flap and one 34 on the PDA body. However, it is not essential for the flap to be positioned at 90° to the PDA body. The aim is to create polarisation diversity between antennas associated with the two ground planes. One ground plane is provided in the PDA body and one in the flap. These two structures are arranged to be separated in use such that polarisation diversity is provided for any orientation of the terminal in an azimuth plane with respect to another entity with which communications are to be effected (e.g. a basestation). For example, in the case of the PDA with a flap, the separation between the two ground planes may only be about 60°.

Any suitable types of antenna can be used taking into account the space available, radiation pattern requirements, installation requirements, and polarisation requirements. For example, monopole antennas, dipole antennas, planar inverted F antennas, patch antennas or slot antennas.

In a preferred embodiment as illustrated in FIG. 4, a first pair of antennas 31, 34 are monopoles and these are mounted on the flap.

Monopoles provide good azimuth coverage and are easy to install. In order to reduce the height required for the monopoles these are preferably top loaded as illustrated in FIG. 4. If top loading does not reduce the length of the monopoles enough, the loading is placed close enough to the monopole to couple to it as illustrated in FIG. 4. Thus in a preferred example, the monopoles are umbrella monopoles with a central strip and two side strips which fan out from the base of the central strip at about 20° to each side as known in the art. The umbrella monopoles are printed within the flap area, one facing up and one facing down and in the particular example of FIG. 4 are formed from copper mounted on a board. Umbrella monopoles are described in more detail in "Small Antennas" by K. Fujimoto, A. Henderson, K. Hirasawa and J. F. James (Research Study Press 1987).

For the second pair of antennas, one antenna 32 is preferably provided in the form of a slot 32 mounted in the flap. Preferably the slot 32 is shortened by top loading in a manner analogous to top loading of dipoles. Slot antennas have similar size and radiation pattern characteristics as dipole antennas and have opposite polarisation. In the particular example of FIG. 4 the ground plane 35 is formed from copper. The other antenna of the second pair is mounted on the PDA body and preferably comprises a monopole.

In this way as many different antenna orientations as possible are used, with dual polarisation and some space and pattern diversity. The azimuth coverage of all four antennas is reasonably uniform, thus providing four diverse signals with comparable signal strength, as required for MIMO or diversity antennas.

Figure 5:
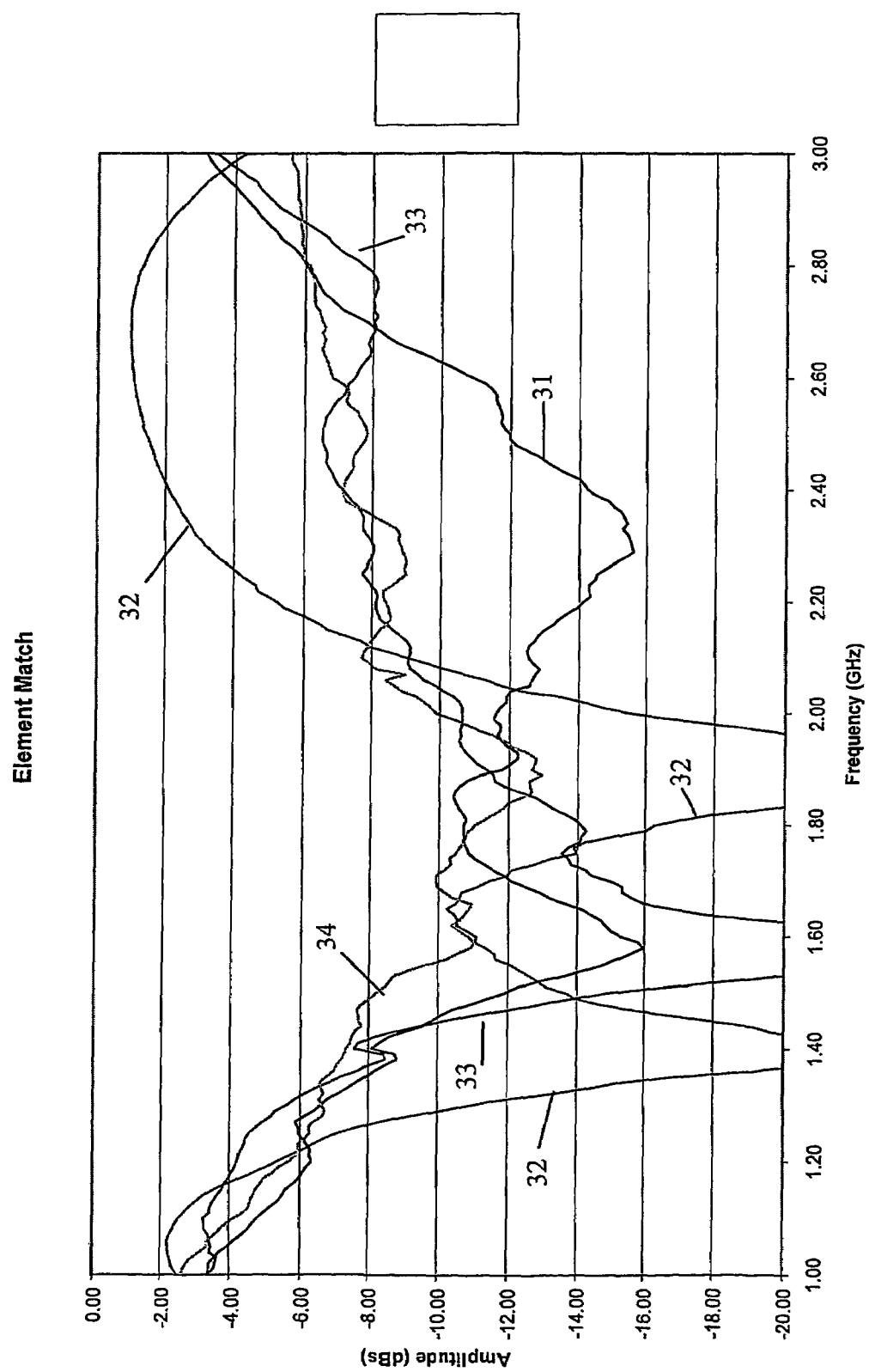
FIG. 5 is a graph showing the return loss for the antennas in the arrangement of FIG. 3.

The match of the umbrella monopoles 31, 33 is sensitive to the proximity of the edge of the ground plane 35 and we identified their optimum position empirically. This optimum position for the arrangement of FIG. 4 is identified by the dimensions given in FIG. 4. As described above the separation of the umbrella monopoles 31, 33 was maximised to provide spatial diversity to give the positions shown in FIG. 4. It was found that further increase in separation of those umbrella monopoles degrades the match to worse than −10 dB. FIG. 5 shows the return loss of antennas 31 to 34 measured in situ on the PDA (or flap). Results for antenna 31 are shown by line 31 in FIG. 5 and so on for the other antennas. FIG. 5 shows that all four of the antennas is operable within the PCS 1900 frequency band. That is, each of the four antennas has a return loss of at least 10 dB between 1850 MHz and 1990 MHz.

Figure 6:
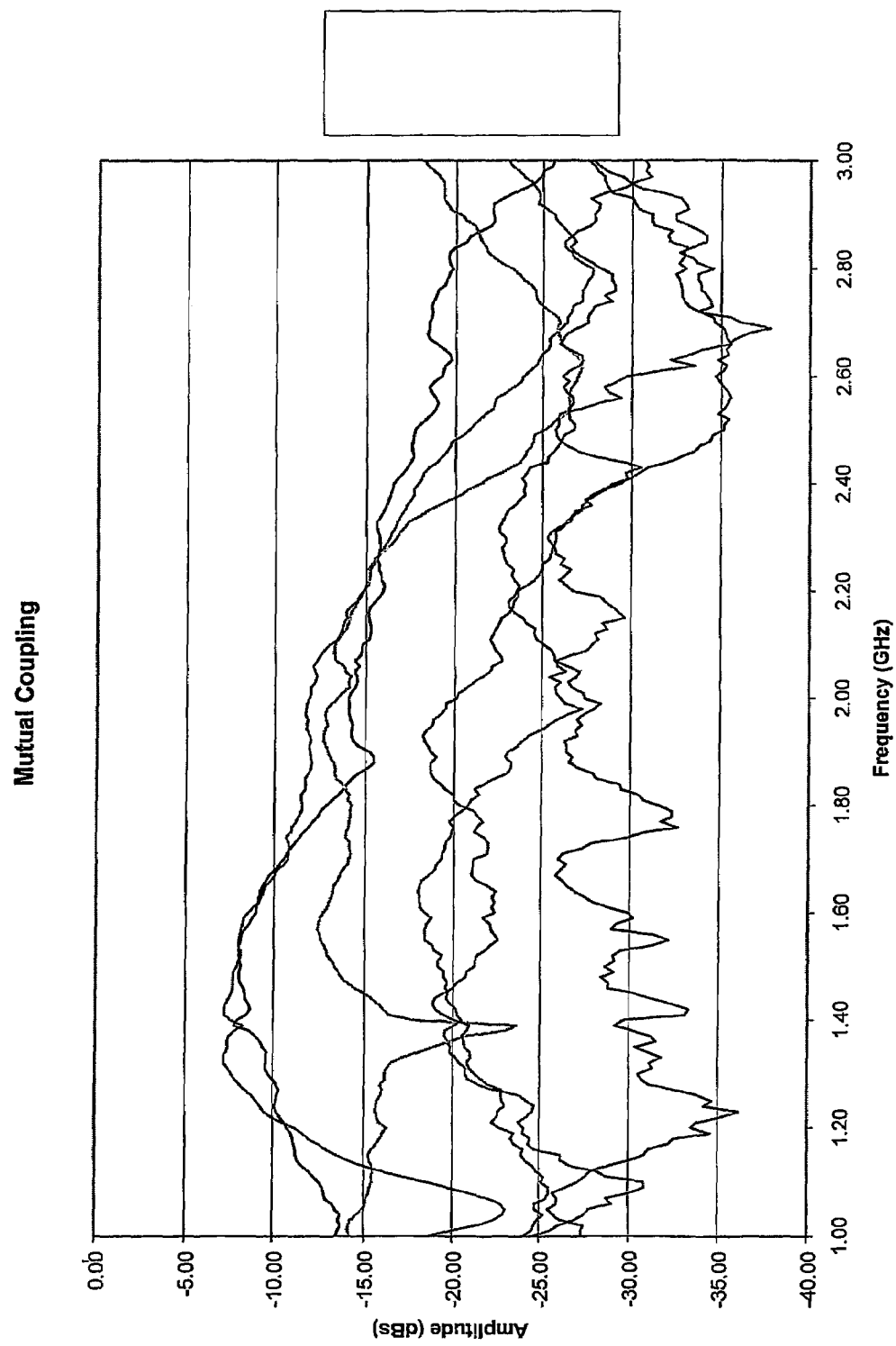
FIG. 6 is a graph showing mutual coupling between the antennas in the arrangement of FIG. 3.

For the antennas to behave independently and to have phase centres separated as widely as possible it is important that the elements are not too tightly coupled to one another. This was assessed by directly measuring the coupling between the elements and the results are shown in FIG. 6. There are six possible pairs of antennas that can be formed from the four antennas of FIG. 3, namely (31, 32), (31, 33), (31, 34), (32, 33), (32, 34), (33, 34), and the six lines in FIG. 6 show the coupling found between each of those pairs. Although some coupling was found as shown in FIG. 6 this was within reasonable levels such that a workable system results.

Figure 7:
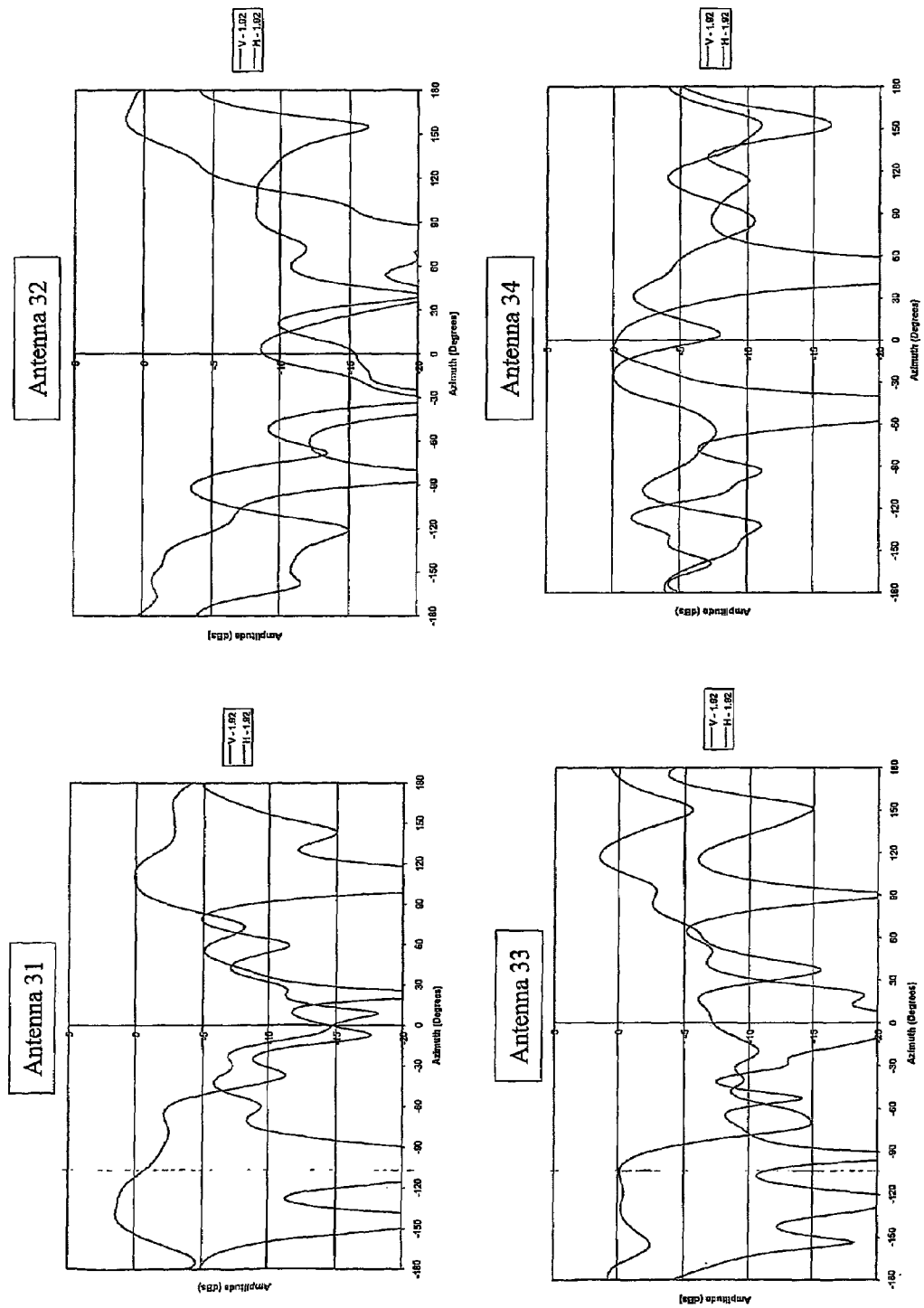
FIG. 7 comprises graphs of the azimuth radiation patterns of the antennas of the arrangement of FIG. 3.
Figure 8:
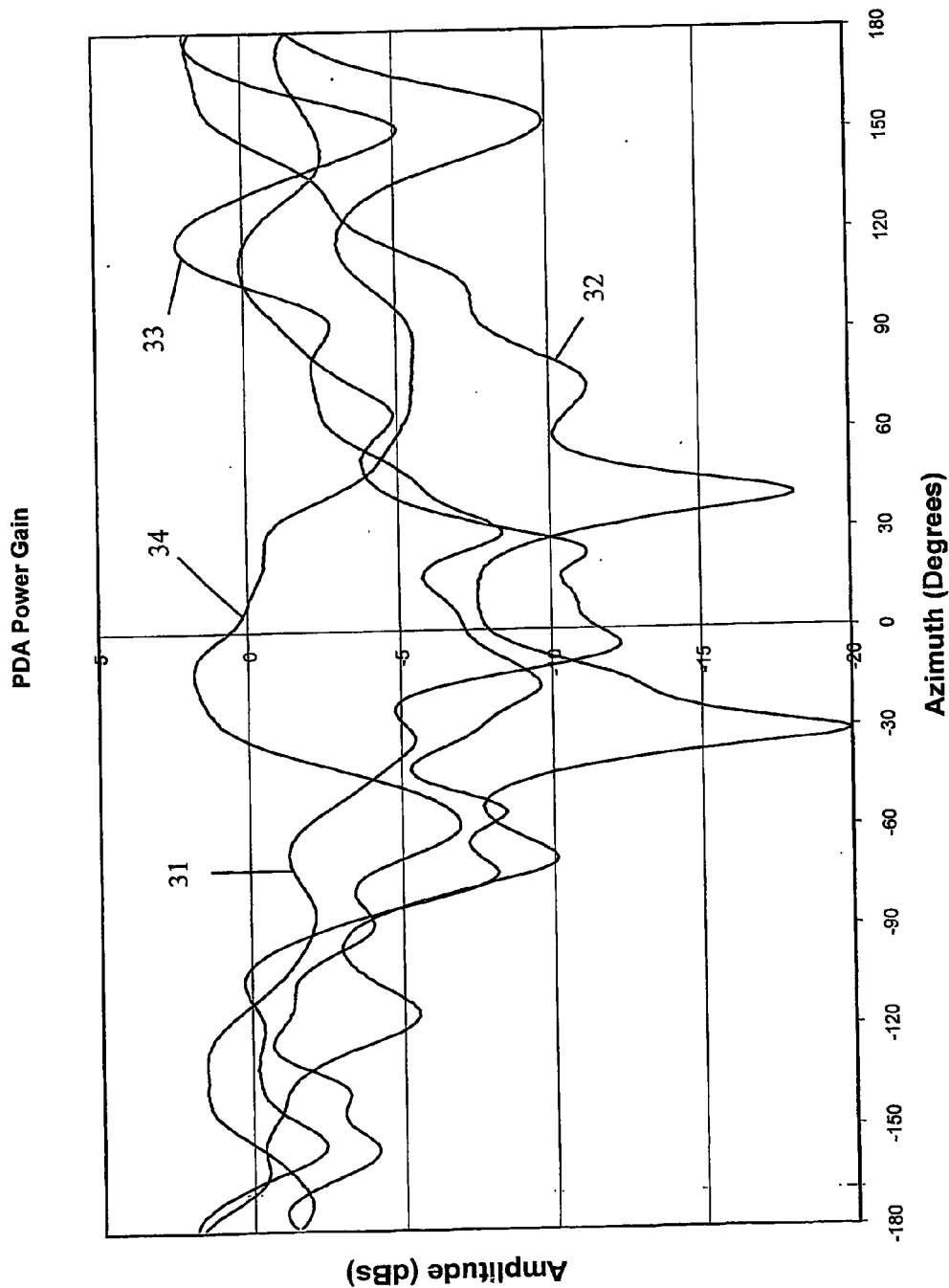
FIG. 8 is a graph showing the radiation patterns of the antennas of the arrangement of FIG. 3.

FIG. 7 shows the azimuth plane radiation patterns for antennas 31 to 34. The antennas were mounted on the PDA (or flap) and had nominal polarisation of +/−45° as described above with reference to FIG. 4. In all cases the patterns show variation of the gain and polarisation as a function of angle. This is largely due to scattering from the PDA. It is also apparent that antennas 31, 32 and 33, which are mounted on the flap have relatively low gain in the boresight direction. This is due to blocking by the body of the PDA. Antenna 34 is unaffected by this because it protrudes above the PDA. FIG. 8 shows the same data as FIG. 7 but plotted as total radiated power, with the four antennas superposed on the same plot. The lower gain of antennas 31 to 33 in the boresight direction is apparent.

The results shown in FIGS. 5 to 8 indicate that the antennas of the arrangement of FIG. 4 radiate effectively. Some scattering occurs as a result of the PDA although this does not significantly detriment the operation of the antenna arrangement. The scattering causes polarisation mixing in the patterns and results in reduced gain in some directions. Also the proximity of the elements to one another results in some correlation of the radiation patterns. However, none of these factors were found to significantly detriment the operation of the antenna arrangement and the benefits of enabling MIMO operation to be provided in a compact antenna arrangement are achieved.

In another embodiment, fewer receive chains than antennas are provided for use in the user terminal. For example, consider the arrangement of FIG. 4. In that case, four antennas are provided and in one embodiment two of those four antennas are selected for use at any one particular time and situation. This provides the advantage that only two receive chains are required which reduces costs and space requirements. Also, it is not necessary for all the antennas to have omnidirectional patterns. Instead antennas with directional patterns can be selected in order to provide good coverage when considered together rather than individually.

An advantage of using antennas with omnidirectional patterns is that the unknown orientation of the user terminal when in use can be accounted for and four equal paths to the receiver provided. These four paths enable capacity to be increased by using a MIMO system if the paths are distinguishable. However, as shown in FIG. 8, the umbrella monopoles (31, 33) exhibit dips in the centre of the radiation pattern as does the folded slot 32. This can be attributed to blocking by the body of the PDA as mentioned above. The external monopole pattern 34 exhibits a much more omnidirectional pattern and can be seen to be more consistent across the azimuth plane.

In the embodiment where two from four antennas are selected the antenna patterns are advantageously complementary. That is, across the azimuth plane two of the four antennas are required at each angle to provide adequate signal strength for each uncorrelated path. In the embodiment described above with reference to FIG. 4 the antenna patterns were designed to be omnidirectional, but the profile of the terminal limited the amount of omnidirectionality achieved due to blocking.

Figure 9:
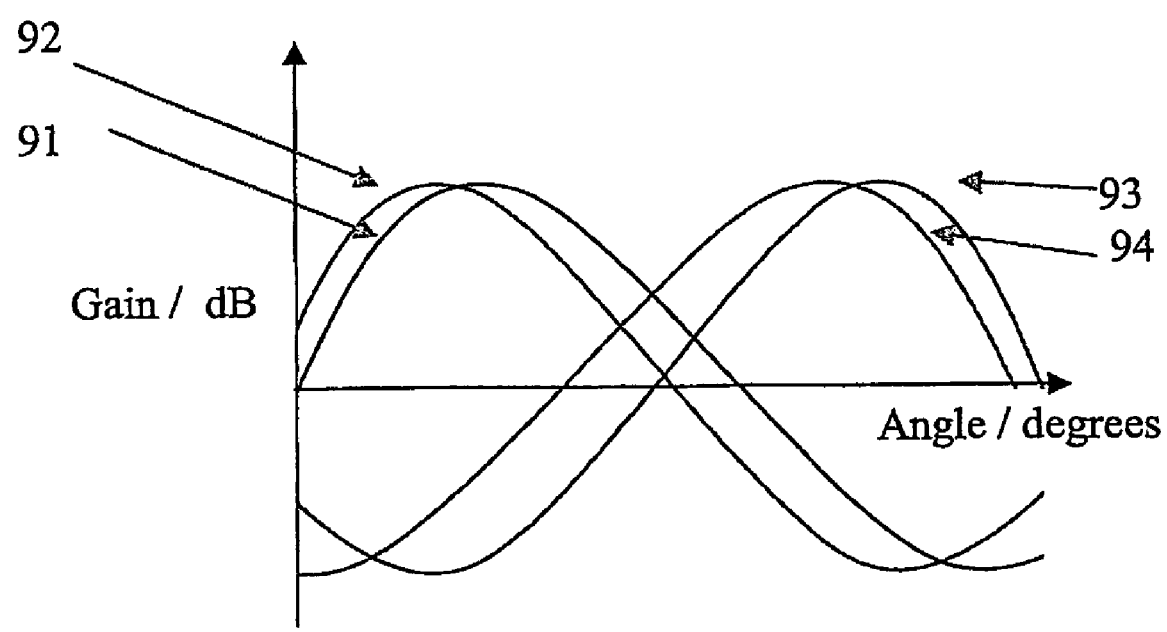
FIG. 9 is a graph of optimised complementary radiation patterns.

In using complementary directive patterns we can not only avoid this but also design the patterns with the body of the PDA in mind. For example, the four antennas of FIG. 4 are preferably arranged to provide the antenna patterns of FIG. 9. Considering traces in FIG. 9 it can be seen that at any angle, two antenna patterns provide good signal strength. For example complementary patterns 91 and 92 could initially be selected and if the signal strength was found to be poor the other patterns 93 and 94 selected. Alternatively, both options could be tested and the best pair of antennas chosen. The selection process may then be repeated at intervals in situations to take account of changes over time (for example, movement of the user terminal and of objects around the terminal).

Any suitable mechanism for directing the antennas can be used as known in the art. For example, the physical arrangement and position of the antennas may provide directionality. Alternatively, mechanical steering can be used to physically direct the antennas. Also, beamforming can be used to achieve directionality.

Figure 10:
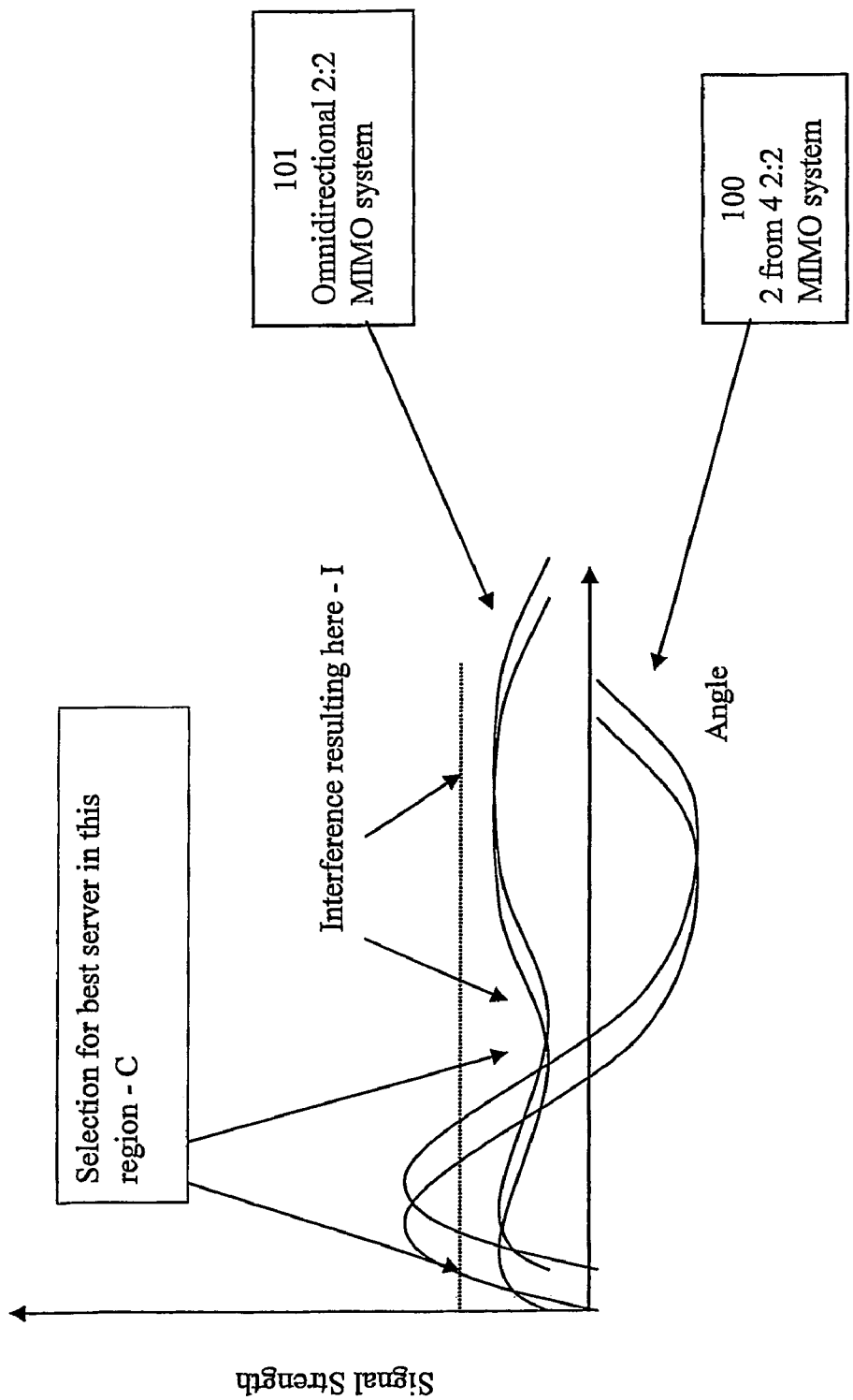
FIG. 10 is a graph of radiation patterns for directional antennas.

Another advantage of using directional antennas and selecting which of these to use according to the particular circumstances is that carrier to interference level ratios can be improved when considering a plurality of user terminals as compared with the situation in which omnidirectional antennas are used. Consider the situation in which omnidirectional patterns are used. In the angle of the best server the pattern provides us with our required carrier in the required region. At all other angles however, the omnidirectional pattern provides a high level of interference to all other carriers. By using directional antennas instead, we can improve this performance by selecting a pattern directed towards the best server. At all other angles the directional pattern is lower in signal strength than before and this reduces interference. This is illustrated in FIG. 10 which shows antenna patterns 100 for two directional antennas selected in a 2 from 4, 2:2 MIMO system and antenna patterns 101 for two omnidirectional antennas also in a 2:2 MIMO system. We can clearly see from FIG. 10 that in the region of interest, best C, the signal is much stronger for the selection antennas than for the omnidirectional antennas. In the region where interference is provided to other carriers, the antenna patterns of the directional antennas mean that a much lower signal is seen in this region by other user terminals, thus improving our overall carrier to interference levels.

The invention claimed is:

1. An antenna arrangement suitable for use in a user terminal in order to provide wireless multiple-input-multiple-output (MIMO) communications, said antenna arrangement comprising:
   (i) at least a first and a second ground plane, the first ground plane arranged to be provided in a body of the user terminal and the second ground plane arranged to be provided external to the body of the user terminal; and
   (ii) three or more antennas each associated with one of the ground planes, at least one of the antennas being associated with the first ground plane and at least two others of the antennas being associated with the second ground plane;

wherein said ground planes are positionable with respect to one another, in use, such that polarisation diversity is provided between antennas associated with different ones of the ground planes; and wherein at least two of the antennas associated with the second ground plane are of different polarisations.

2. An antenna arrangement as claimed in claim 1 wherein said antennas are arranged and positioned in order that angular coverage provided by the antennas in use is maximised in at least one plane.

3. An antenna arrangement as claimed in claim 1 wherein at least some of said antennas are arranged to provide spatial diversity.

4. An antenna arrangement as claimed in claim 1 wherein said user terminal is arranged to be hand held.

5. An antenna arrangement as claimed in claim 1 wherein said user terminal comprises a display and wherein one of said ground planes is arranged to be substantially parallel with the display.

6. An antenna arrangement as claimed in claim 5 wherein another of said ground planes is arranged to be provided in a flap moveably connected to the user terminal.

7. An antenna arrangement as claimed in claim 1 which is arranged to operate at least one wavelength and wherein the length of the user terminal is about 0.5 to 1 of that wavelength.

8. An antenna arrangement as claimed in claim 1 wherein each antenna is substantially co-planar with its associated ground plane.

9. An antenna arrangement as claimed in claim 1 wherein each of said antennas is directional in that it has a directive gain in one of at least two different directions.

10. A communications device comprising an antenna arrangement as claimed in claim 1 and which further comprises fewer receive chains than there are antennas.

11. An antenna arrangement suitable for use in a user terminal in order to provide wireless multiple-input-multiple-output (MIMO) communications, said antenna arrangement comprising:
  (i) at least a first and a second ground plane, the first ground plane arranged to be provided in a body of the user terminal and the second ground plane arranged to be provided external to the body of the user terminal; and
  (ii) a first pair of antennas and a second pair of antennas, each of the antennas being associated with one of the ground planes, at least one of the antennas being associated with the first ground plane and at least another of the antennas being associated with the second ground plane, and said first pair of antennas being polarisation diverse with respect to the second pair of antennas.

12. An antenna arrangement as claimed in claim 11 wherein the first pair of antennas is fed from the second ground plane and only one of the second pair of antennas is also fed from the second ground plane.

13. An antenna arrangement as claimed in claim 12 wherein said one of the second pair of antennas is a slot.

14. An antenna arrangement as claimed in claim 12 wherein the other of the second pair of antennas is a monopole.

15. An antenna arrangement as claimed in claim 12 wherein said other of the second pair of antennas is arranged to protrude from the user terminal in use.

16. An antenna arrangement as claimed in claim 11 wherein the first pair of antennas are spaced as far apart from one another as possible whilst still being suitable for accommodation in the user terminal.

17. An antenna arrangement as claimed in claim 11 wherein said first pair of antennas are selected from monopoles and umbrella monopoles.

18. A user terminal comprising an antenna arrangement suitable for providing wireless multiple-input-multiple-output (MIMO) communications, said antenna arrangement comprising:
  (i) at least a first and a second ground plane, the first ground plane being provided in a body of the user terminal and the second ground plane being provided external to the body of the user terminal; and
  (ii) three or more antennas each associated with one of the ground planes, at least one of the antennas being associated with the first ground plane and at least two others of the antennas being associated with the second ground plane;

wherein said ground planes are positionable with respect to one another, in use, such that polarisation diversity is provided between antennas associated with different ones of the ground planes; and wherein at least two of the antennas associated with the second ground plane are of different polarisations.

19. A multiple-input-multiple-output communications system comprising a user terminal as claimed in claim 18 and a signal processor arranged to implement a space time coding communications transmission or reception method.

20. A method of transmitting or receiving space time coding communications using a user terminal comprising the steps of:
  (i) providing at least a first and a second ground plane, the first ground plane being provided in a body of the user terminal and the second ground plane being provided external to the body of the user terminal; and
  (ii) providing two three or more antennas each associated with one of the ground planes, at least one of the antennas being associated with the first ground plane and at least two others of the antennas being associated with the second ground plane;

wherein said ground planes are positionable with respect to one another, in use, such that polarisation diversity is provided between antennas associated with different ones of the around planes; and wherein at least two of the antennas associated with the second ground plane are of different polarisations.

* * * * *